(12) United States Patent
Stude

(10) Patent No.: US 9,062,601 B1
(45) Date of Patent: Jun. 23, 2015

(54) FREE PISTON ENGINE USING EXHAUST GAS FOR PROVIDING INCREASED THRUST TO AN AIRCRAFT TURBINE ENGINE

(71) Applicant: Michael H. Stude, Garfield, KS (US)

(72) Inventor: Michael H. Stude, Garfield, KS (US)

( * ) Notice: Subject to any disclaimer, the term of this patent is extended or adjusted under 35 U.S.C. 154(b) by 109 days.

(21) Appl. No.: 13/760,802

(22) Filed: Feb. 6, 2013

(51) Int. Cl.
| | | |
|---|---|---|
| F02B 71/00 | (2006.01) | |
| F02B 71/06 | (2006.01) | |
| F02B 75/04 | (2006.01) | |
| F02B 75/02 | (2006.01) | |
| F02B 71/04 | (2006.01) | |

(52) U.S. Cl.
CPC .............. F02B 71/06 (2013.01); *F02B 71/00* (2013.01); *F02B 75/04* (2013.01); *F02B 2075/025* (2013.01); *F02B 71/04* (2013.01)

(58) Field of Classification Search
CPC .. F02B 2075/025; F02B 71/045; F02B 71/00; F02B 71/04; F02B 75/04
USPC ....................................................... 123/46 R
See application file for complete search history.

(56) References Cited

U.S. PATENT DOCUMENTS

| | | | | | |
|---|---|---|---|---|---|
| 5,313,872 | A | * | 5/1994 | Foster | 91/407 |
| 5,329,768 | A | * | 7/1994 | Moscrip | 60/518 |
| 6,102,577 | A | * | 8/2000 | Tremaine | 384/493 |
| 2008/0202838 | A1 | * | 8/2008 | Ohashi et al. | 180/242 |
| 2010/0251692 | A1 | * | 10/2010 | Kinde, Sr. | 60/226.1 |

* cited by examiner

*Primary Examiner* — Lindsay Low
*Assistant Examiner* — Charles Brauch
(74) *Attorney, Agent, or Firm* — Edwin H. Crabtree; Ramon L. Pizarro

(57) ABSTRACT

A free piston engine used for providing power augmentation to an aircraft turbine engine. The engine has a central cylinder, a central piston, fuel intake valves and exhaust ports, for exiting hot exhaust gases. The exhaust gases are used to help drive turbine blades in the turbine engine. The piston includes a piston drive shaft with opposite ends attached to first and second ported push rods The push rods are attached to first and second intake pistons. The intake pistons can include magnets mounted thereon and used to generate DC electrical current. The central power cylinder includes first and second spark plugs connected to first and second ignition coil and used for igniting the fuel received through the ported push rods and moving the central piston back and forth inside the central cylinder.

7 Claims, 19 Drawing Sheets

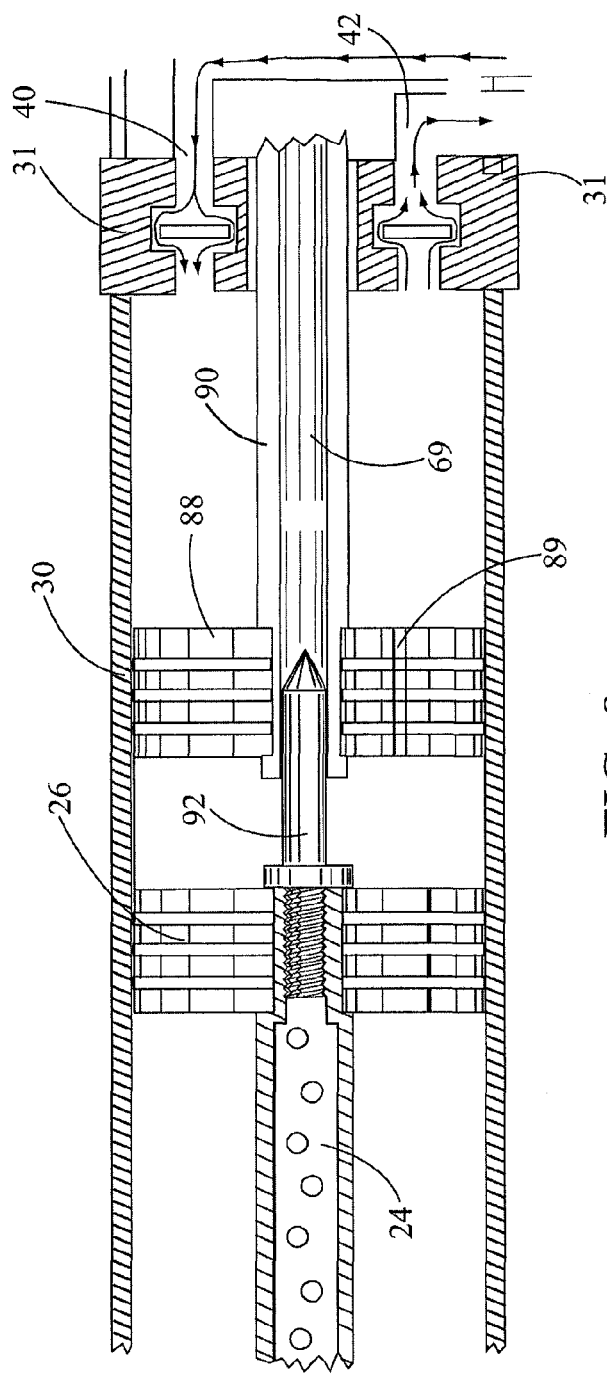
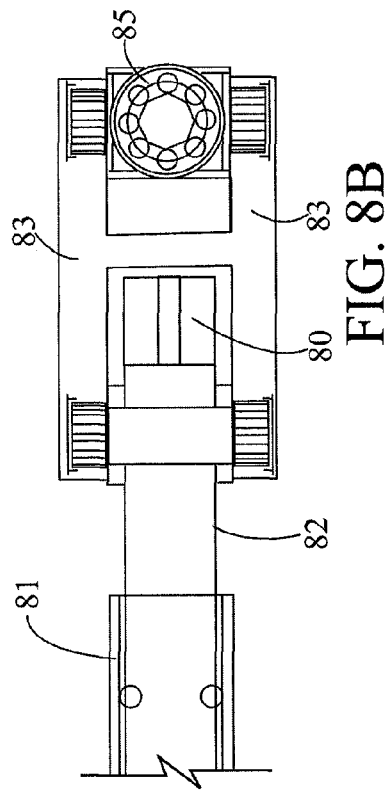
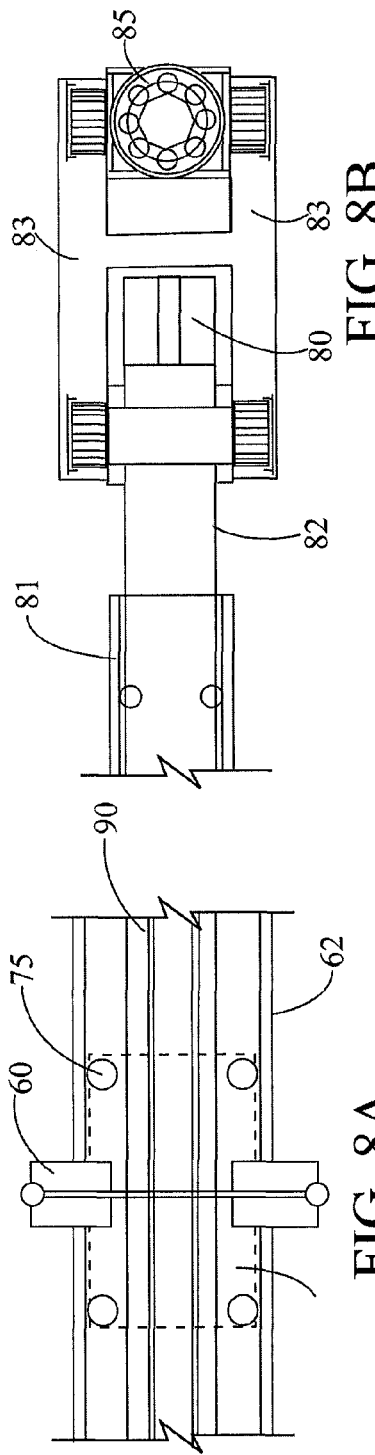
FIG. 8
FIG. 8A
FIG. 8B

US 9,062,601 B1

FREE PISTON ENGINE USING EXHAUST GAS FOR PROVIDING INCREASED THRUST TO AN AIRCRAFT TURBINE ENGINE

BACKGROUND OF THE INVENTION (a) Field of the Invention

This invention relates to an improved free piston engine used with an aircraft gas turbine engine and more particularly, but not by way of limitation, to a free piston engine used as a power augmentation device or PAD for increased engine performance. Also, the free piston engine can be used to power engine turbine accessories and using different types of fuel, due to its 20 to 1 compression ratio.

(b) Discussion of Prior Art

Heretofore, a typical aircraft turbine engine, such as a Pratt and Whitney JT8D, produces an average of 250 psi at the engine's stators. The subject invention is designed to produce an average of up to 500 psi at the engine's stators at high altitudes and using less fuel with increased engine thrust. This feature allows for cutting back of the fuel to the engine's combustors and allowing combustion air to be used for cooling the stators and turbine blades.

SUMMARY OF THE INVENTION

In view of the foregoing, it is a primary objective of the subject invention to provide a free piston engine for generating hot, exhaust gas for an aircraft turbine engine to increase engine performance at high altitudes. The free piston engine can be used in conjunction with the turbine engine's combustors.

Another key object of the invention is the free piston engine can be used for powering a turbine engine compressor and a drive gear box. Also the engine can be used to generate direct current, used for compressing fluids and gases, and used for powering an adjustable oscillating drive mechanism, that changes from a reciprocating action of the engine to a rotating drive shaft action, along with operating various other engine accessories.

Yet another object of the invention is the free piston engine is similar to a 2 cycle engine and therefore is light weight and simple in construction. Also and because of its 20 to 1 compression ratio, the engine can operate using different types of fuel.

Broadly, the subject free piston engine includes a central piston with piston rings and a drive shaft received inside a central power cylinder with exhaust ports. The opposite ends of the drive shaft are attached to a right and a left ported push rod with push rod rings. The push rods can be used to generate DC electrical current. The right and left push rods are received inside push rod cylinders. The central power cylinder includes a first spark plug and a second spark plug connected to a first and second ignition coil. The spark plugs are used for igniting a compressed air/fuel mixture received through the ported push rods and moving the central piston back and forth inside the central power cylinder. At the same time, the right and left push rods move back and forth with a fuel mixture received inside the push rod cylinders, which is ignited using a magnetically actuated ignition switch.

These and other objects of the present invention will become apparent to those familiar with the aircraft turbine engines and turbine engine accessories when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject free piston engine, and in which:

FIGS. 8, 8A and 8B illustrate portions of the free piston engine and linkage for connection to the oscillating drive shaft.

DETAILED DESCRIPTION OF THE PREFERRED EMBODIMENTS

Figure 1:
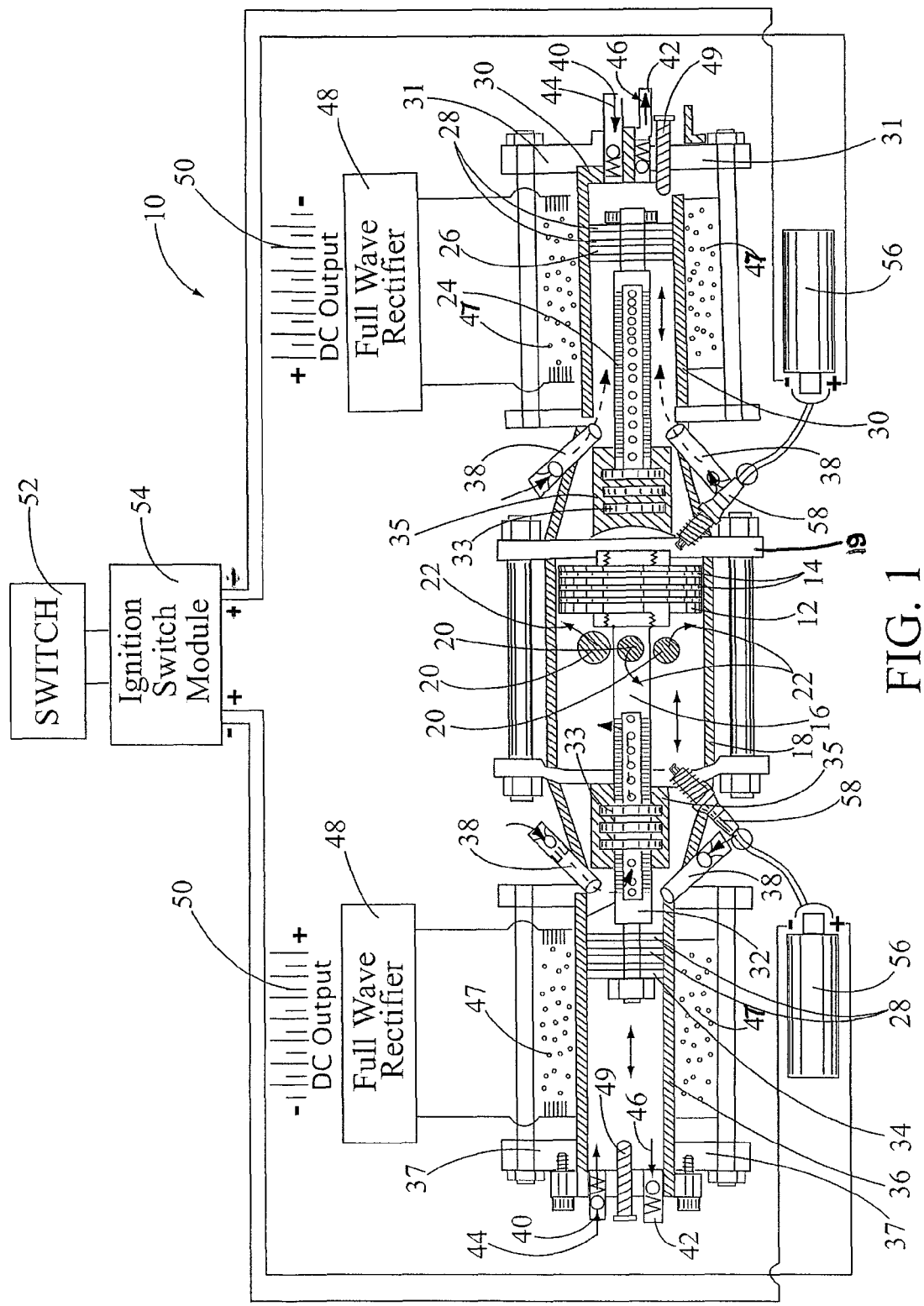
FIG. 1 is a front sectional view of the free piston engine used for producing high pressure exhaust gas. The drawing illustrates the various components of the engine.

In FIG. 1, the front sectional view of the subject free piston engine is shown having general reference numeral 10. The free piston engine 10 includes a central piston 12 with piston rings 14 and mounted on a piston drive shaft 16. The drive shaft 16 and the central piston 12 are received inside a central power cylinder 18 with exhaust ports 20 for exhausting high pressure, compressed gas, shown as arrows 22. The high pressure gas 22 is used to help power an aircraft turbine engine with added thrust and produce an average of up to 500 psi to the engine's stators, during high altitude operation.

In this drawing, a right side of the ported push rod shaft 24 is shown attached to a first intake piston 26, with intake piston rings 28. The first intake piston 26 is received inside a first intake cylinder 30. On a left side or opposite side the drive shaft 16, it is connected to a second ported push rod shaft 32 attached to a second intake piston 34, with intake piston rings 28. The second intake piston 34 is received inside a second intake cylinder 36. The push rod shafts 24 and 32 include seals 33 received inside bushings 35 to prevent compressed gas leakage between the central piston 12 and the push rods. The ported push rod shafts 24 and 32 are used for introducing compressed air/fuel in to the central power cylinder for compression up to 500 psi and greater.

The first and second intake cylinders 30 and 36 include one-way fuel and air intake valves 38 or fuel injectors at one end of the cylinders. Also, the cylinders 30 and 36 include air intake ports 40 for receiving compressed intake air or compressed hydraulic fluids, as indicated by arrows 44 and discharge ports 42, for discharging compressed gas or compressed hydraulic fluids, as indicated by arrow 46. The cylinders 30 and 36 include cylinder heads 31 and 37. The cylinder heads 31 and 37 include an ignition switch 49, which is used for the initial starting of the engine 10.

Alternator armature wire 47 is received around the push rod cylinders 30 and 36 and connected to a full wave rectifier 48. The rectifier 49 is used to generate DC electrical current through DC outputs 50, using the oscillations of the push rods 24 and 32. The cylinders 30 and 36 are made of stainless steel, which allows magnetic lines from magnets 74, shown in FIG. 4, mounted on pistons 26 to cross over to the armature wire 47 connected to the rectifier 48. Due to the high speed of the engine 10, high voltage is generated and transferred to the full wave rectifier 48.

The DC outputs 50 are adapted for providing electrical power to an engine motor or fuel pump attached to the subject engine 10 or other electrical applications. The engine motor or pump is not shown in this drawing. The alternator armature wires 47 are actuated by an induced voltage generated by the magnetic flux from the moving magnets 74, shown in FIG. 4, while the engine 10 is running.

Electrical power is supplied to the free piston engine 10 by turning "on" an electrical switch 52, which is connected to an ignition switch module 54. The module 54 is wired to a pair of ignition coils 56. The coils 56 are connected to a pair of spark plugs 58 for igniting the combustion gas received inside the central power cylinder 18.

Figure 2:
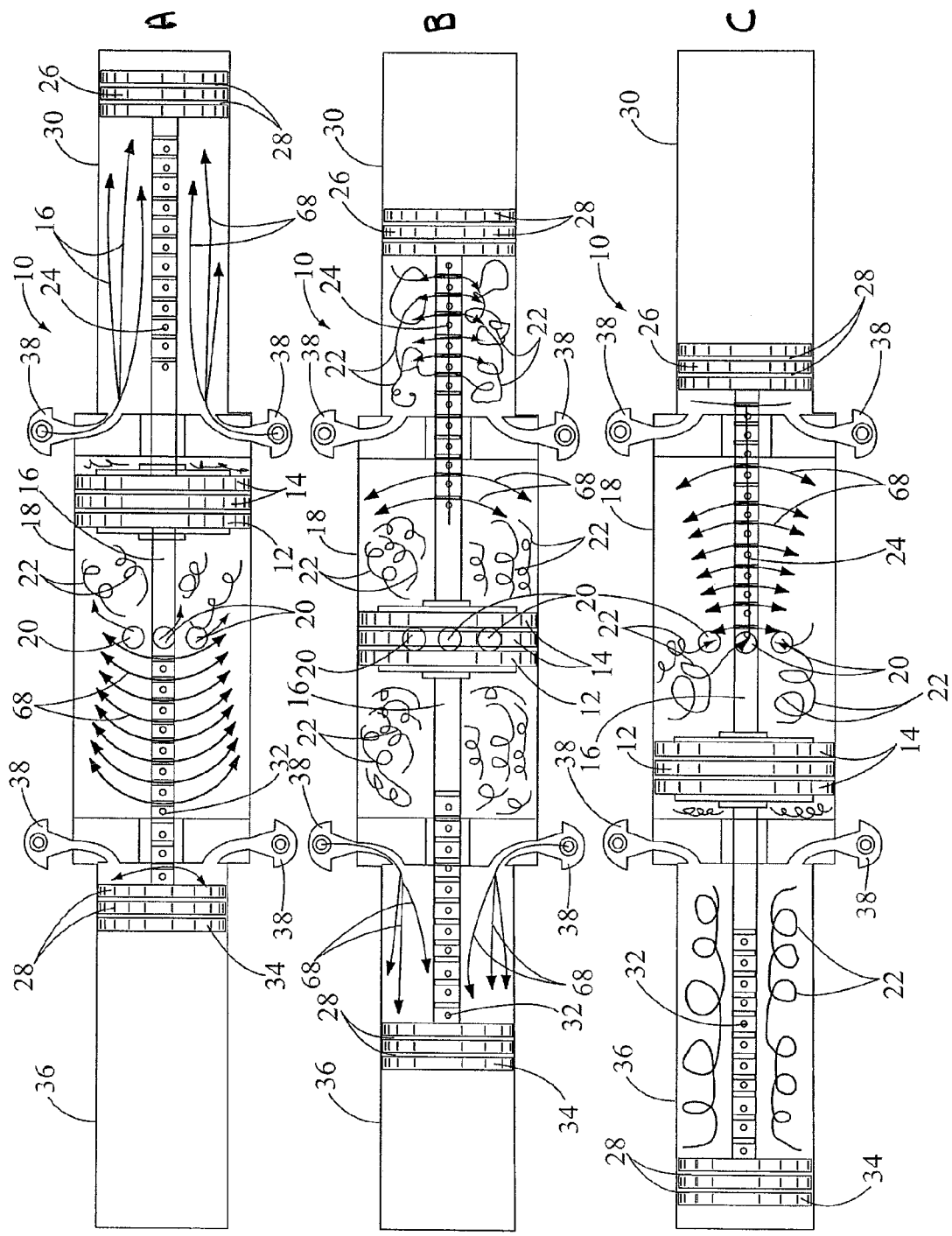
FIG. 2 is a front sectional view of the operation of the free piston engine.
Figure 3:
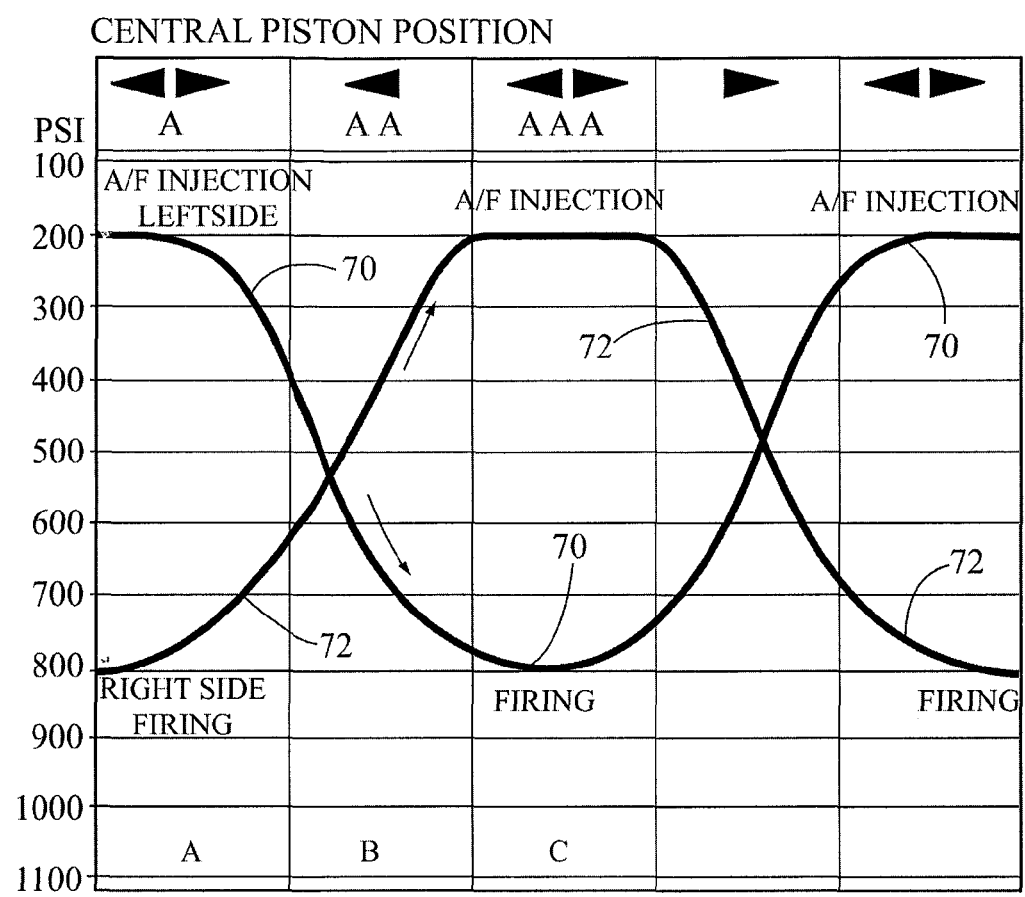
FIG. 3 illustrates ignition curves and pressure in the central power cylinder during the movement of the central piston from left to right.

In FIGS. 2 and 3, the operation of the free piston engine 10 is illustrated. In the upper portion of FIG. 2, the central piston 12 and the first and second pistons 26 and 34 have moved to the right in their respective cylinders. As this time, exhaust gas 22 exits the power cylinder 18 through the exhaust ports 20 and used for driving an attached accessory unit. Also at this time, an air/fuel mixture, shown as arrows 68, enters the first intake cylinder 30 through intake valves 38. Also, the air/fuel mixture 68 is introduced into the power cylinder 18 and through the ported push rod 32, which has moved from left to right into the power cylinder. At this time, the compressed intake air/fuel forces the exhaust out the exhaust ports 20.

In FIG. 3, the pressure in the central power cylinder 18 on the left side of the central piston 12 is approximately 200 psi, as shown by ignition curve 70. At the same time and on the right side of the central piston 12, the pressure is approximately 800 psi and after ignition of the air/fuel mixture 68, as shown by ignition curve 72. After the initial startup of the engine, the ignition system is no longer required and the engine fires by compression alone.

In the center portion of FIG. 2, the central piston 12 and the first and second pistons 26 and 34 have moved to the center of their respective cylinders. As this time, exhaust gas 22 continues to exit the power cylinder 18 through the exhaust ports 20 and exits the first intake cylinder 30. Also at this time, the air/fuel mixture 68 begins to enter the second intake cylinder 36 through intake valves 38. Further and at this time, the air/fuel mixture 68 is introduced into the power cylinder 18 and through the ported push rod 24, which has moved from right to left into the power cylinder and forces the exhaust gas out.

In FIG. 3, the pressure in the central power cylinder 18, when the central piston 12 is centered in the cylinder, is approximately 550 psi, as shown by the two ignition curves 70 and 72.

In the lower portion of FIG. 2, the central piston 12 has now moved to the left in the power cylinder 18 and the first and second pistons 26 and 34 are moved to the left in their respective cylinders.

At this time during the combustion cycle, as shown in FIG. 3, the pressure on the left side of the central piston is now approximately 800 psi after combustion, as shown by ignition curve 70 and approximately 200 psi on the right side of the piston 12, as shown by ignition curve 72.

Figure 4:
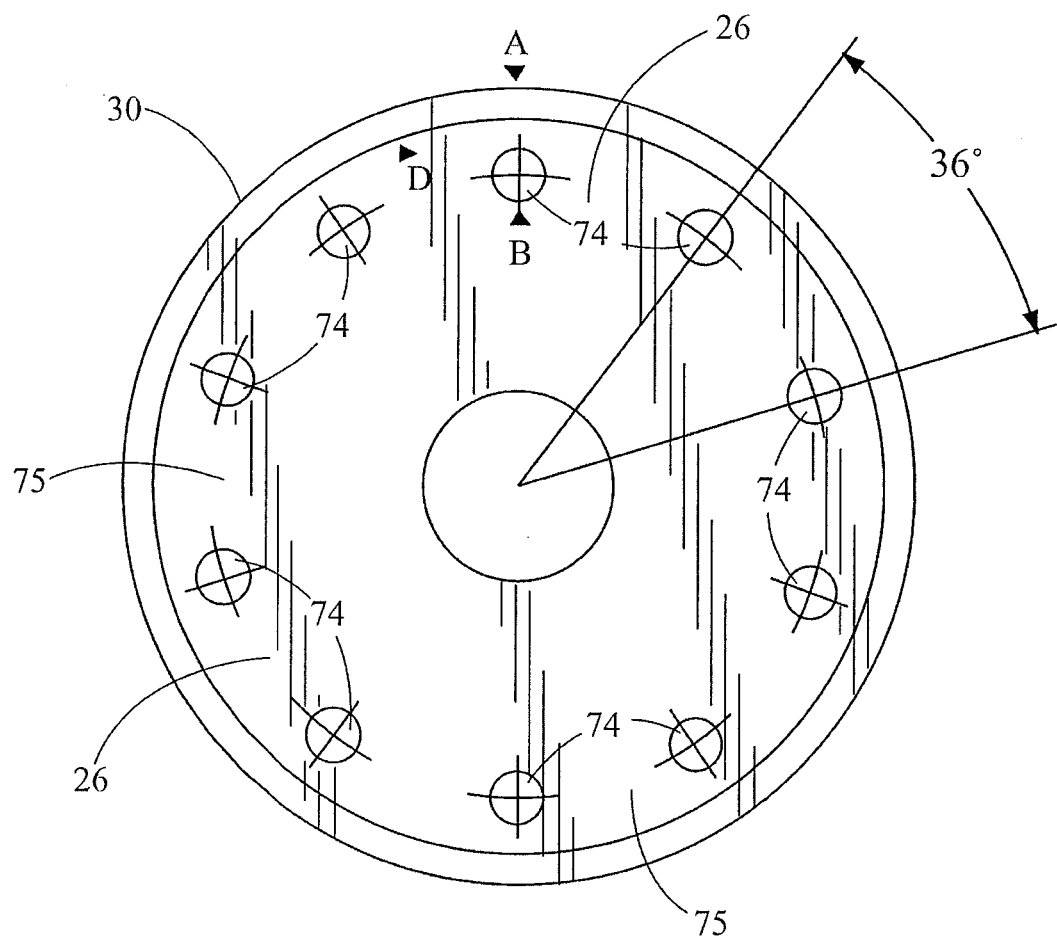
FIG. 4 is a front view of the first intake piston received in the first intake cylinder.

In FIG. 4, a front view of the first intake piston 26 inside first intake cylinder 30 is shown, with the first ported push rod 34 shown in cross section. A plurality of magnets 74 are attached to the piston 26 and spaced apart 36 degrees around the circumference of the piston. The magnets 74 are also mounted in a similar manner on the second intake piston 34. Using the magnets 74 on the first and second intake pistons 26 and 34, the movement of the pistons and magnets work in conjunction with the full wave rectifiers 48 for generating direct current from the free piston engine 10 and engaging the ignition switches 49. If hydrogen peroxide, H2O2, is added to the fuel and when contacted by the piston 34 with the rusty washer 75 mounted thereon, the H2O2 with release by catalytic action oxygen and steam pressure. This key feature helps pressurize the intake gases in the first intake cylinder 30 and allow the released oxygen to burn freely with the fuel mixture. Also, the washer 75 can be mounted on opposite sides of the central piston 12 for breaking down the H2O2 in the fuel for producing oxygen in the central power cylinder 18, In FIG. 5, a pair of spaced apart, parallel free piston engines 10 are shown mounted in an engine housing 76. The two engines 10 are attached to an oscillating drive system, having general reference numeral 78, used for power drive augmentation. This system 78 is used to convert the linear motion, shown as arrows 77, of the free piston engine 10 to rotational motion, shown as arrows 9. Ends of the first and second intake cylinders 30 and 36 are shown with compressed air intake and discharge ports 79 for receiving a mixture of compressed air and engine oil, which can be used as a source of compressed air for operating engine accessories.

In this drawing, the first and second push rod shafts 24 and 32 are separated by oil that is pressurized between pistons 26 and 34. The pistons 26 and 34 are separated pressurized oil from pistons 88. The pistons 88 are connected to piston shafts 90 that extend outwardly from the ends of the free piston engine 10 and are attached to hinge 60 connected to a 90 degree square shaft extension 80. The square shaft extension 80 is attached to a hinge 60 received inside a square housing 62 attached to ends of the first and second cylinders 30 and 36. The square housing 62 includes oil seals 64. The oil seals 64 are used to make sure oil form oil supply lines 65 is directed into the hollow shaft 32 and not around the outer circumference of the shaft.

The end of the shaft extensions 80 are pinned to an opposite end of a pair of parallel, balanced, anti-torque square shafts 82. The square shafts 82 are received inside square shaft housings 81. The opposite ends of the square shafts 82 are attached to a linkage 83 and an angular eccentric bushing 84, mounted on first bearing housings 85. The bushing 84 transfers the linear motion of the square shaft 82 to the rotary motion of an output rotary shaft 86, mounted on the first bearing housings 85. The opposite ends of the rotary shaft 86 are shown extending outside the engine housing 76 for driving an auxiliary power unit.

Figure 5:
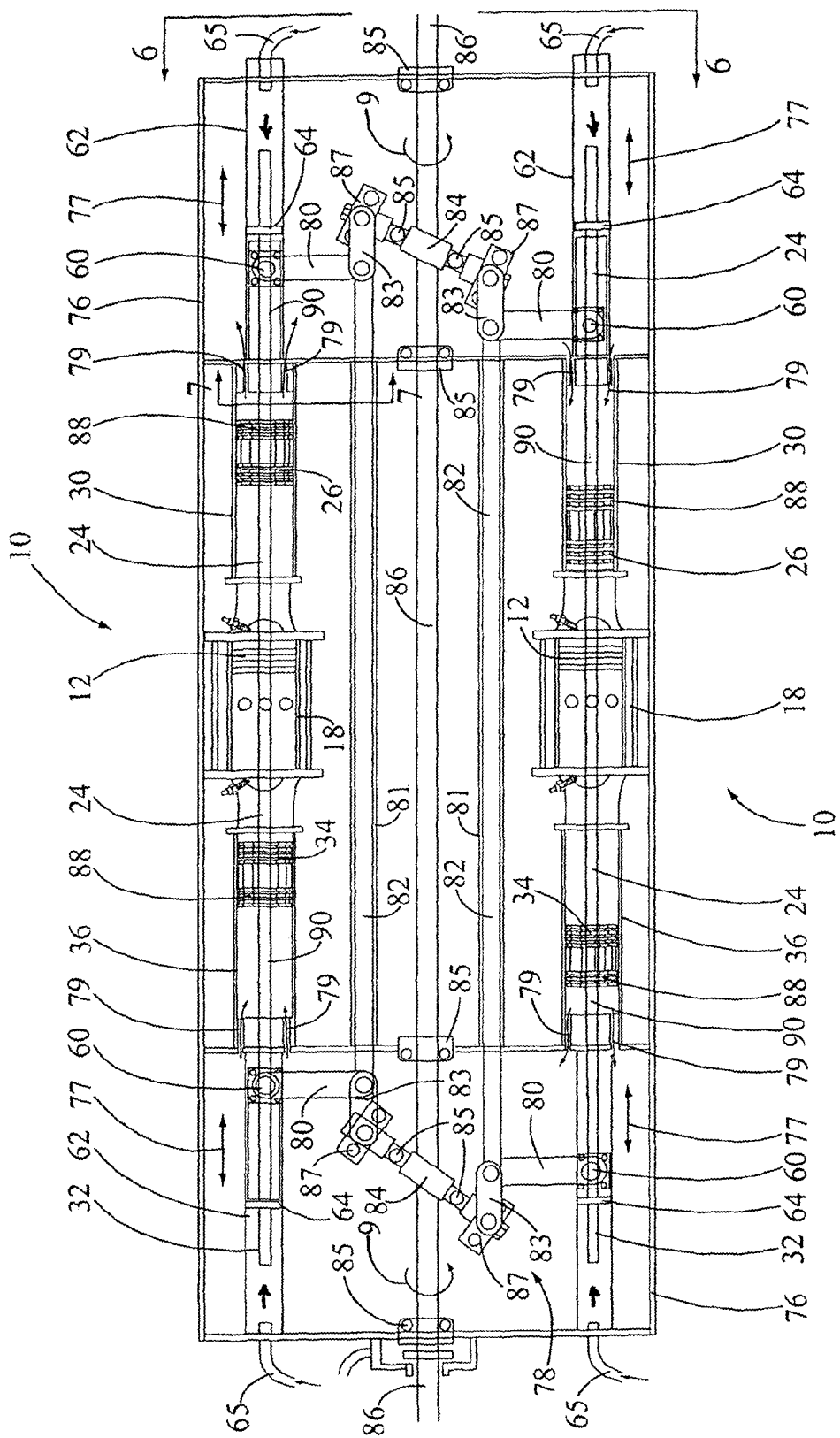
FIG. 5 illustrates mechanical linkage attached to a pair of parallel free piston engines. The linkage used for driving an adjustable oscillating drive shaft, that changes from a reciprocating action of the engine to a rotating drive shaft action.
Figure 6:
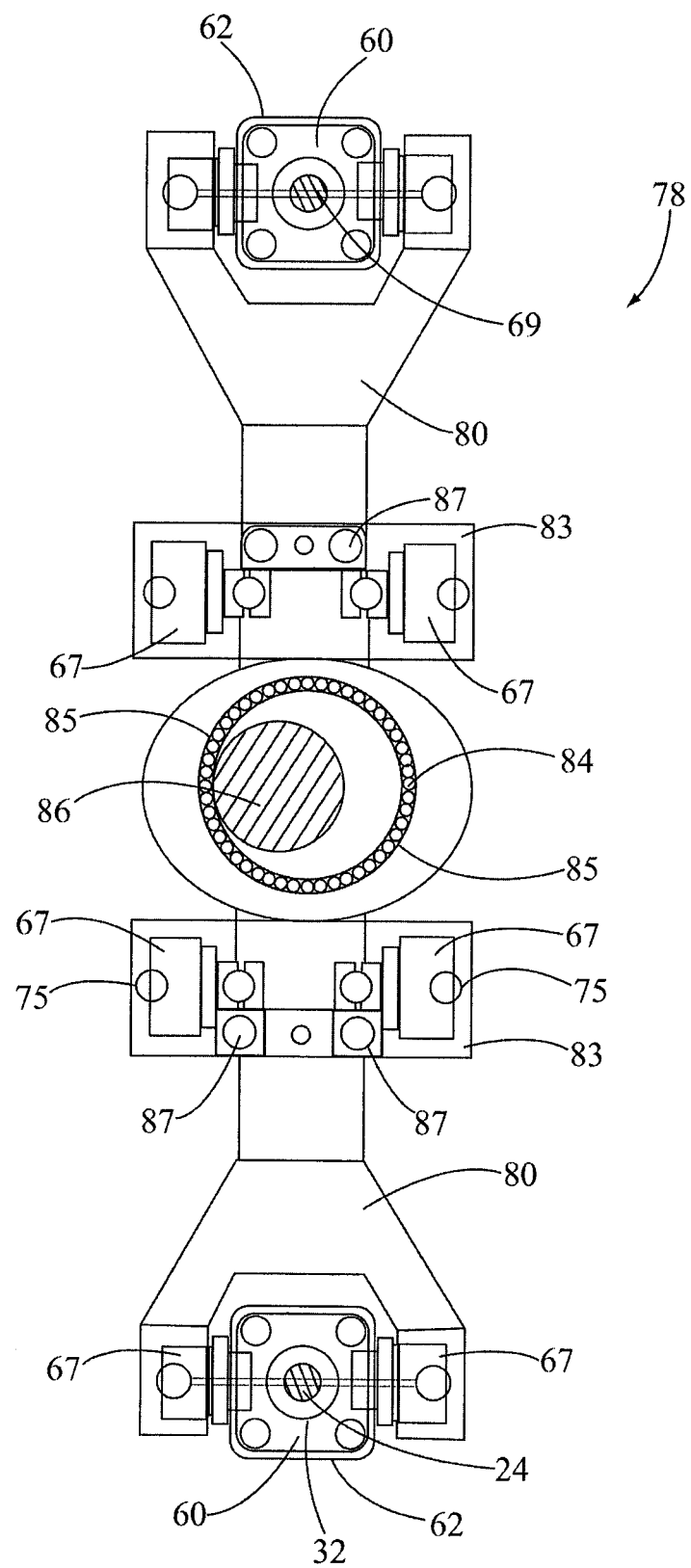
FIG. 6 is a sectional view of the linkage and the adjustable oscillating drive shaft shown in FIG. 5.

In FIG. 6, an end view of the oscillating drive system 78 is shown and taken along lines 6-6, shown in FIG. 5. In this drawing, the output rotary shaft 86 is shown mounted inside the eccentric bushing 84. The bushing 84 is attached to the first bearing housings 85 and linkage 83. The linkage 83 is connected to one end of the 90 degree square shaft extension 80 using second bearing housings 87 with needle bearings 67. The second bearing housing 87 allow the bushing 84 to rotate horizontally while the first bearing housings 85 allow the bushing 84 to oscillate with the shaft 86, thus allowing for torquing. The opposite end of the extensions 80 is connected to the shaft 24, which is received through bearing housing 62.

Figure 7:
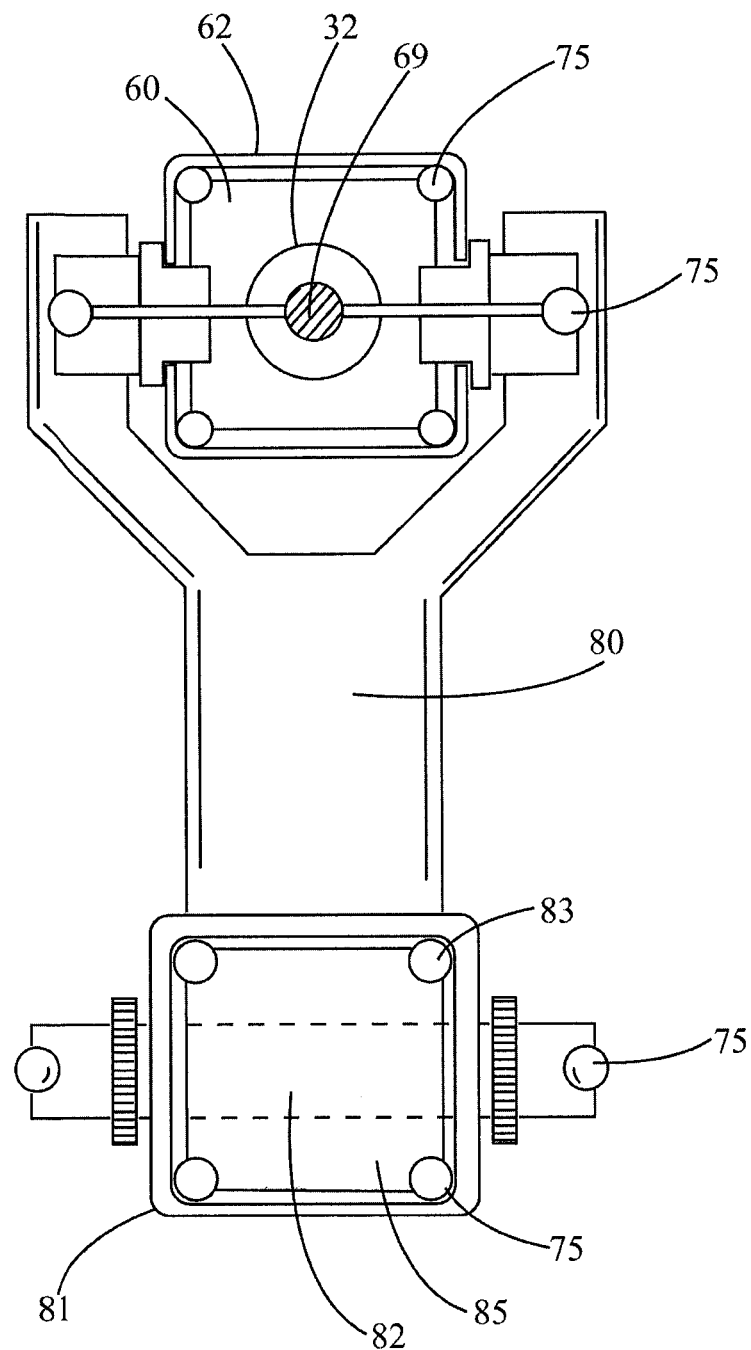
FIG. 7 is another sectional view of a portion of the oscillating drive shaft shown in FIG. 5.

In FIG. 7, an end view of the 90 degree square shaft extension 80 is illustrated and taken along lines 7-7, shown in FIG. 5. In this drawing, the bearing housings 85 are shown supporting the push rod shaft 24, with the shaft attached to one end of the 90 degree square shaft extension 80. The opposite end of the extension 80 is shown attached to the square shaft 82 and linkage 83. The square shaft 82 is shown received through a first bearing housing 81 and supported on needle bearings 67 and ball bearings 75.

In FIG. 8, an enlarged view of a portion of the free piston engine 10 is shown with the first intake cylinder 30 including a hydraulic piston 88 and seal rings, with a hollow, hydraulic piston shaft 90. The first intake piston 26 is shown with a piston valve 92 slidably received inside the hollow shaft 90. The piston valve 92 is used to trap a preset amount of hydraulic oil and cushion the shock from rapid changes in the linear motion of the engine 10. The throw of the central piston 12 can be altered using oil pressure to increase fuel efficiency. The cylinder head 31 can be vented when pressure and temperature increases. Also, the cylinder head 31 uses intake and discharge ports 40 and 42 to produce compressed air with an oil bypass. The oil is then separated from the air and returned to a gear box 77.

The piston 88 is shown including an oil circulation port 89. The movement of the piston 26 is used to operate the hydraulic piston 88 and compressing hydraulic oil and pivoting the 90 degree square shaft extension 80, used in operating the oscillating drive system shown in FIG. 5. Also, the movement of the air is shown received through the intake port 40 and out the discharge port 42 in the cylinder head 31. The above structure described above and shown in FIG. 8 is also included in the second intake cylinder 36.

In FIGS. 8A and 8B, a portion of the hydraulic piston shaft 90 is shown and the linkage 83 attached to the 90 degree square shaft extension 80.

Figure 9:
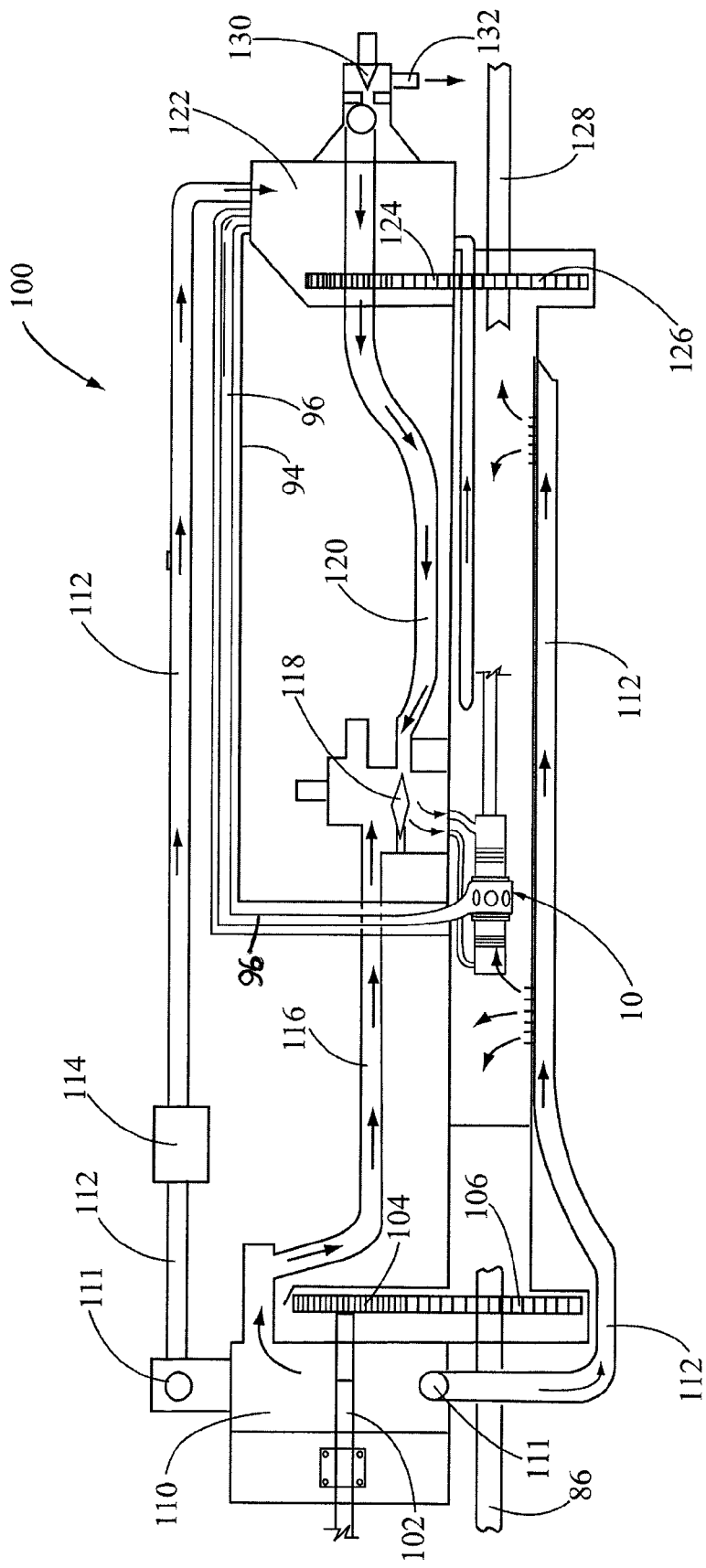
FIG. 9 is a front sectional view of an air compressor, carburetor and gear driven turbine driven by exhaust gas and a drive shaft through a gear box from the free piston engine.

In FIG. 9, a front sectional view of an air compressor and gas turbine system is shown having general reference numeral 100. The turbine system 100 is driven by the output shaft 86 of the oscillating drive system 78, shown in FIG. 5. This system 100 can be used to supplement an aircraft's turbine combustors for improved engine performance.

The system 100 includes a first stage compressor shaft 102 coupled to the output rotary drive shaft 86. The shaft 102 includes a driven gear 104 connected to a drive gear 106. The drive gear 106 is mounted on the engine's output rotary shaft 86. The gears are disposed inside a compressor housing 110. The housing 110 includes air outlet ports 111 and an air cooling manifold 112, with an air intake valve 114 for regulating the amount of pressurized intake air to a section of a turbine engine.

In this drawing, compressed air is received from the compressor housing 110 through a compressed airline 116. The airline 116 is connected to a carburetor 118. The carburetor 118 is used to regulate hot compressed air from a turbine intake manifold 120 connected to a turbine housing 122, with turbine blades mounted therein. The turbine blades are not shown in the drawings. The turbine blades are used to drive a turbine drive gear 124 connected to a turbine driven gear 126. The driven gear 126 is connected to a turbine output shaft 128 used to supplement power to the aircraft's turbine engine. The turbine housing 122 also includes a gas exhaust valve 130 and an exhaust outlet 132. Air from the turbine exhaust to the intake manifold 120 is adjusted to 180 degrees F. for proper vaporization of the 2 cycle oil used in the free piston engine 10. Exhaust gases are routed to run a turbine 96 plus cooling air is circulated through a housing 94 that collects normally lost heat injected inside the turbine housing 122. When the free piston engine 10 is used directly on the housing of a jet engine, the compressor and gas turbine system 100 are not required.

Figure 10:
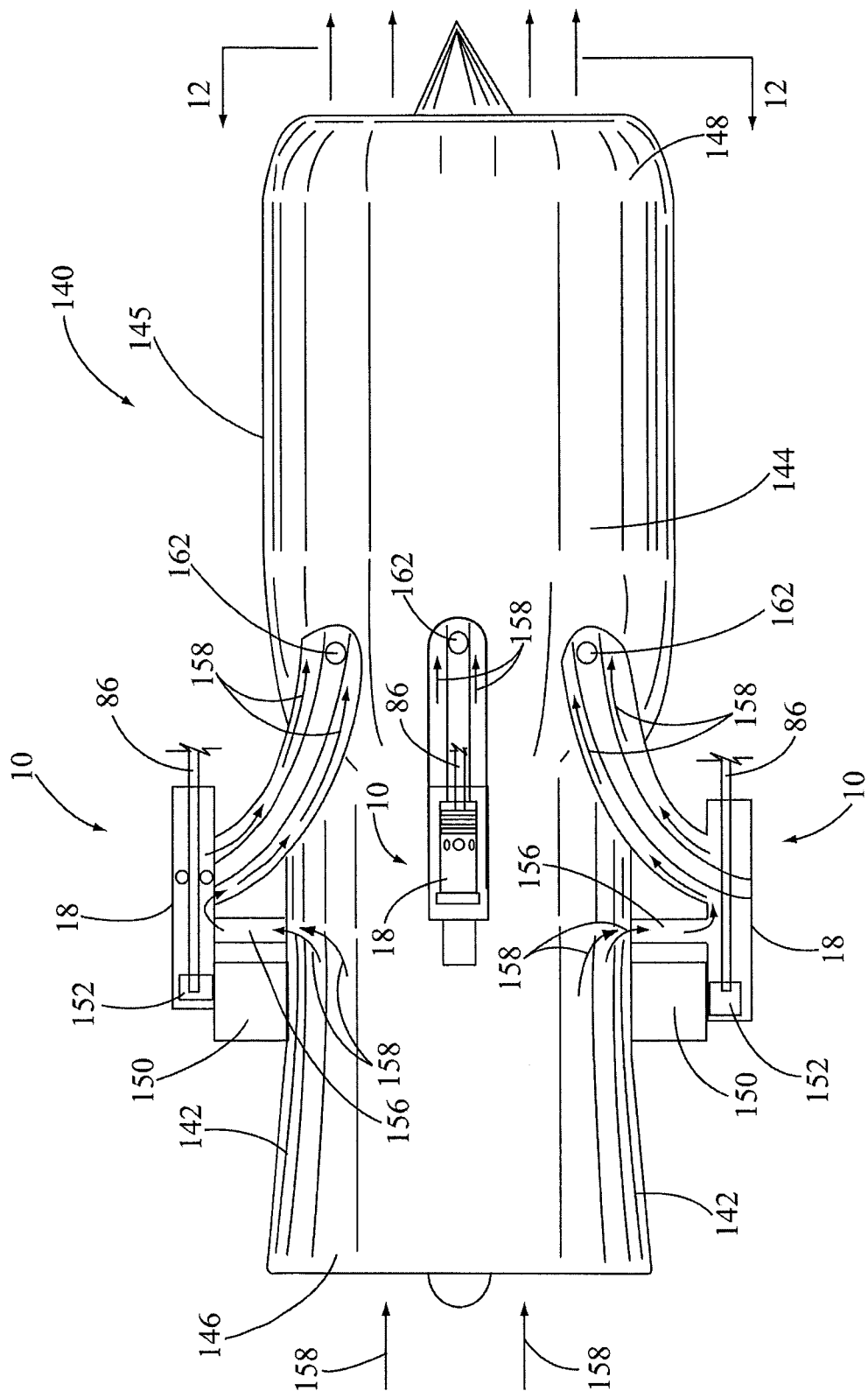
FIG. 10 is a side view of an aircraft turbine engine a plurality of free piston engines mounted on the engine's exterior housing.

In FIG. 10, a side view of an aircraft turbine engine is illustrated having a general reference numeral 140. The engine 140 is shown having an exterior housing 142 with a housing combustor section 144 and a turbine housing section 145. The turbine blades are mounted behind the combustor section 144. Disposed around a center portion of the housing 142 are spaced apart free piston engines 10 for provided added thrust to the engine 140.

The turbine engine 140 includes an intake air portion 146 and an exhaust air portion 148. The engine housing 142 includes a pair of gear boxes 150 and 152 for driving from the free piston engine's rotating shaft 86. The rotating shaft 86 is attached to the main accessory gearbox, which provides for speed reduction to the free piston engine 10 and allows for increased horsepower input through a high pressure exhaust port 162 used for rotating the engine's turbine blades. Also, the engines 10 include an air cooling tube 156 for receiving lower pressure intake air, shown as arrows 158. The intake air 158 is circulated through the engine 10, into the exhaust air tubes 160 connected to air exhaust ports 162, and then into the turbine stator. The exhaust air can then enter into the side of the turbine housing depending on the location of the compressor and depending on whether first stage air or high pressure air is used.

Figure 11:
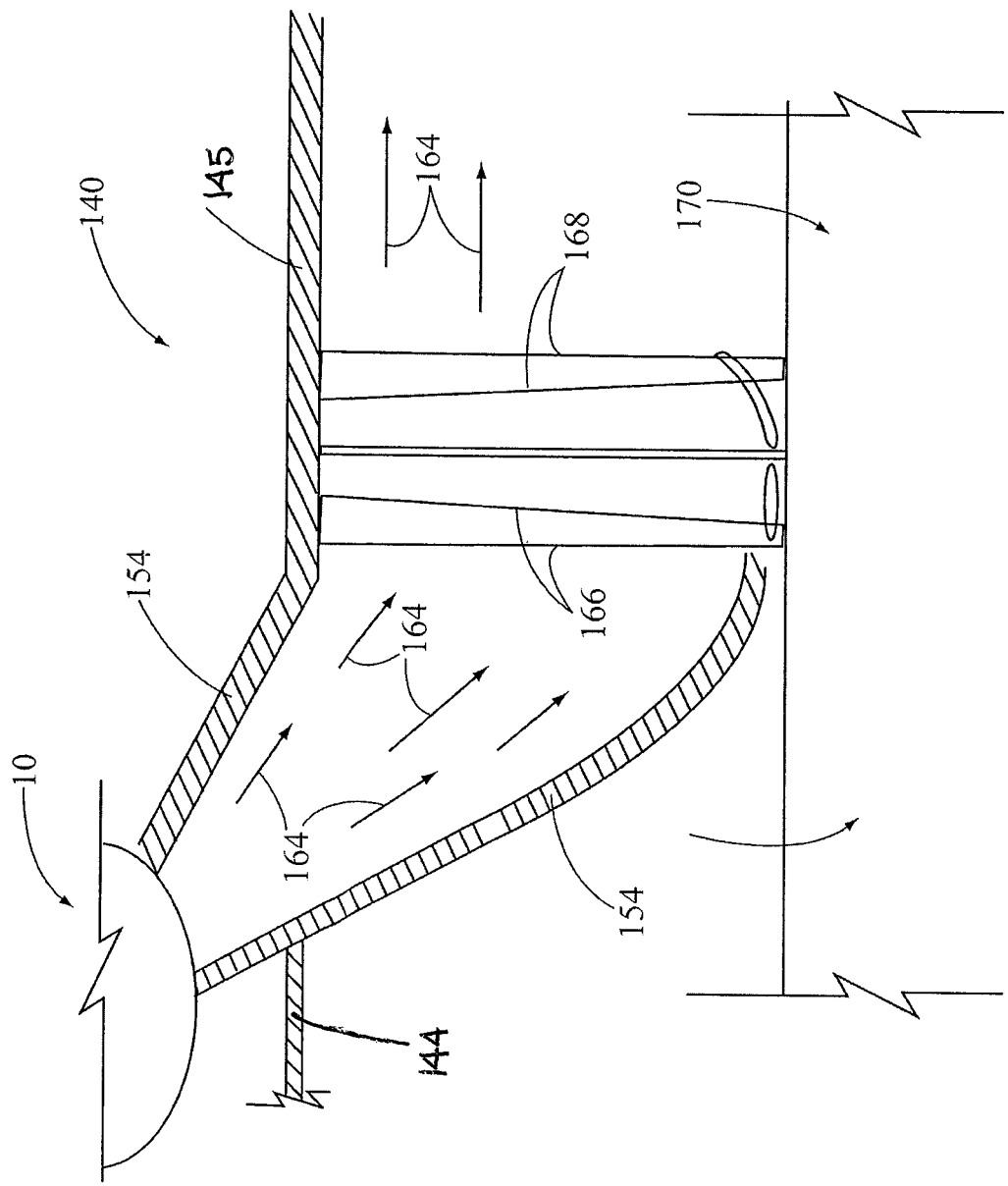
FIG. 11 illustrates a portion of a free piston engine with an exhaust nozzle, shown in cross section, attached to a turbine fan exhaust case.

In FIG. 11, a portion of one of the free piston engines 10, as shown in FIG. 10, is illustrated for introducing the hot exhaust gas, indicated by arrows 164, through the exhaust nozzle 154 attached to the housing combustor section 144 and the turbine housing section 145. The nozzle 154, the housing combustor section 144, and the turbine housing section 145 are shown in cross-section. As mentioned above, the exhaust gas provides for additional thrust to the aircraft turbine engine 140 for turbine stator blades 166 and turbine rotor blades 168 mounted on a turbine drive shaft 170. The coolant intake air 158, shown in FIG. 10, can be used to help cool the turbine blades since it is less than 1000 degrees F.

Figure 12:
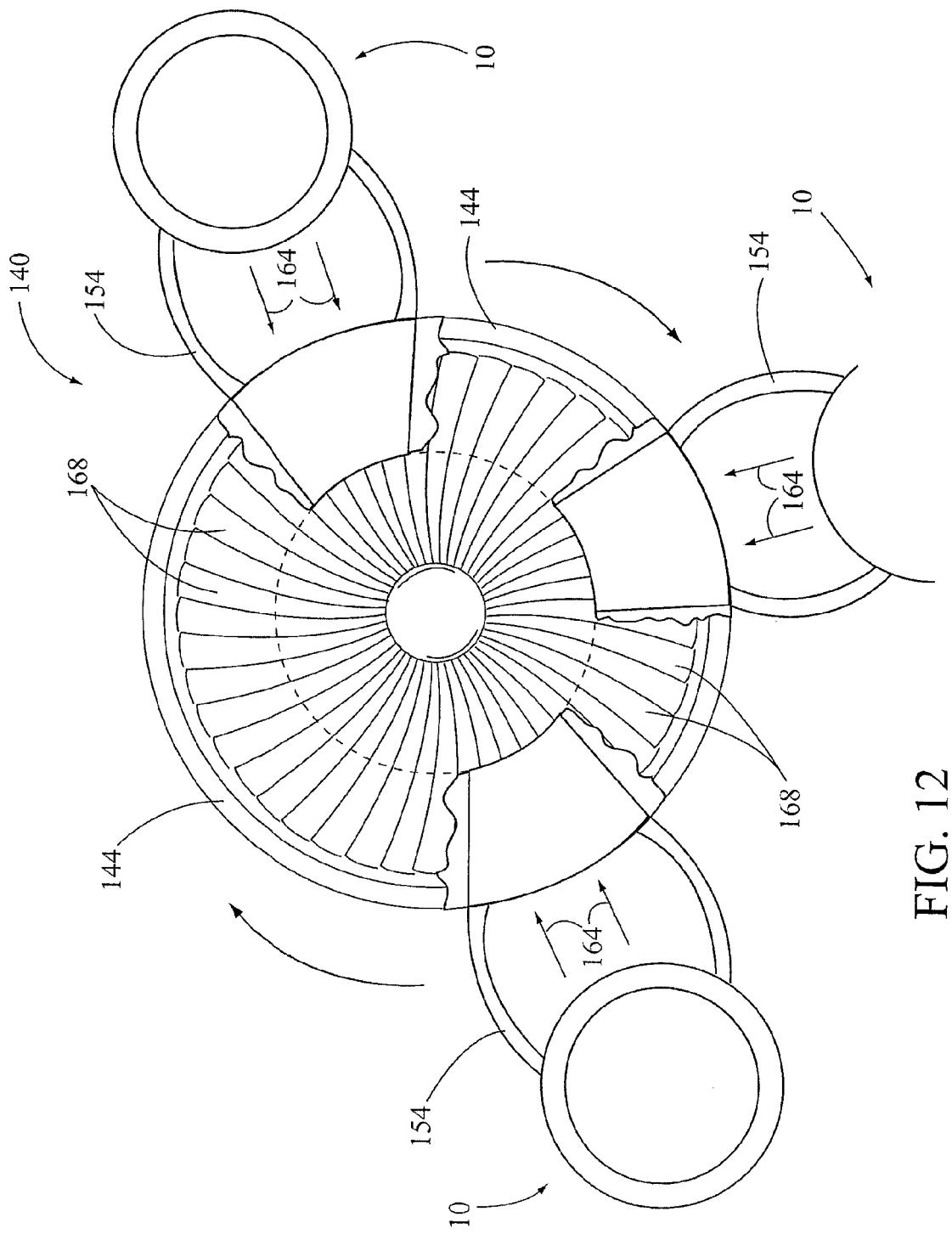
FIG. 12 is a front view of the turbine engine with the free piston engines attached to the outer circumference of the turbine fan exhaust case.

In FIG. 12, a front view of the turbine engine 140 is shown with the free piston engines 10 attached around an outer circumference of the turbine fan compressor housing 144. In this drawing, the hot exhaust gas 164 from the engines 10 is shown directed through the exhaust nozzle 154 into the inside of the turbine engine 140 for driving the turbine rotor blades 168.

Figure 13:
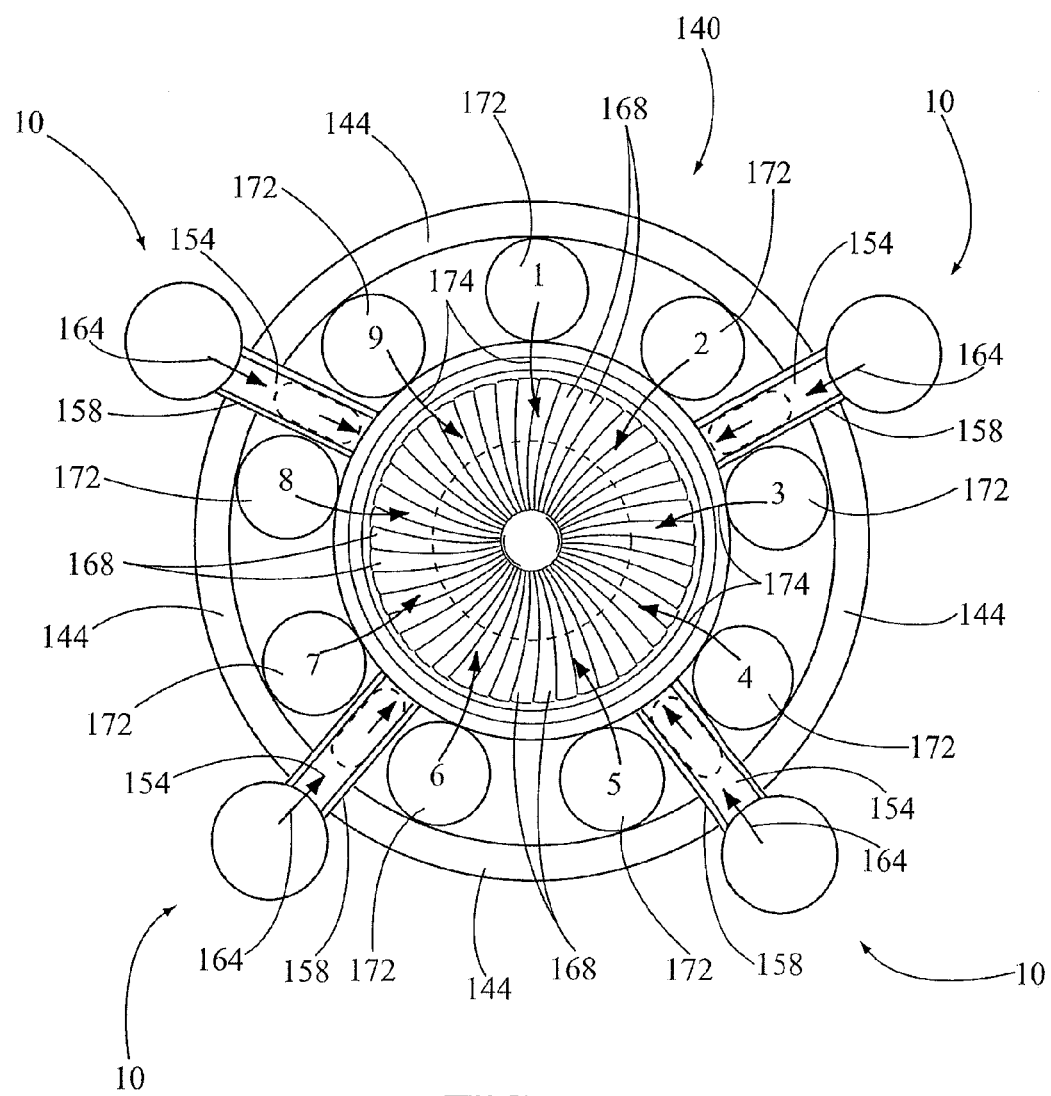
FIG. 13 is another front view of the turbine engine with nine turbine engine combustors mounted around the inner circumference of a combustion section of a compressor housing.

In FIG. 13, another view of the turbine engine 140 is shown with nine turbine engine combustors 172 equally spaced around an inner circumference of the turbine fan combustor section 144. The combustors 172 are shown introducing exhaust air pressure, indicated by arrows 174, into the engine 140 and mixing with the hot exhaust gases 164 for driving the turbine blades 168. Due to the higher pressure of the free piston engine exhaust gases, the combustors may have to be altered to eliminate back flow of the exhaust gases due to the higher pressure developed by the free piston engine 10.

Figure 14:
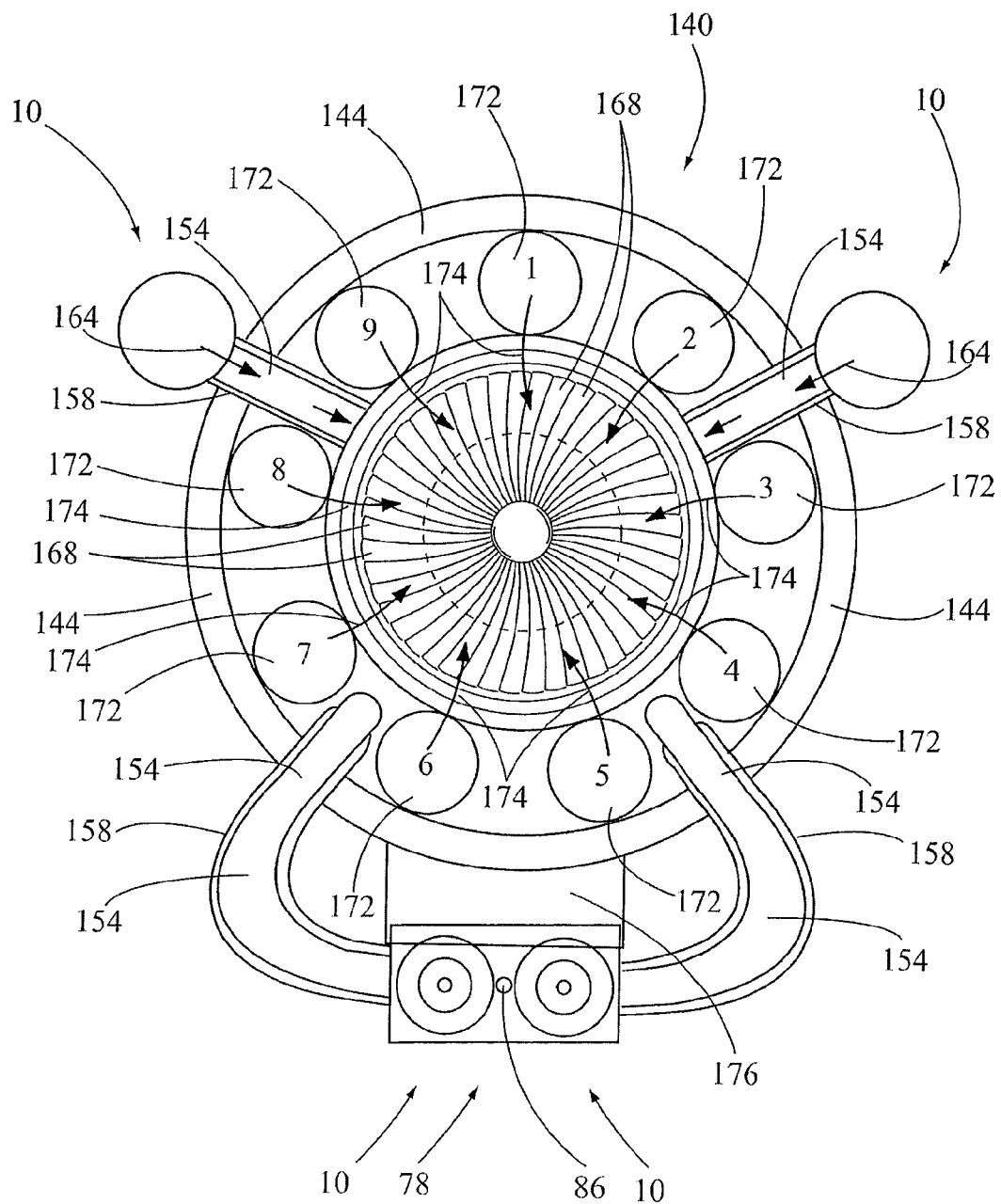
FIG. 14 illustrates a pair of free piston engines connected together to form an oscillating drive system and mounted on the aircraft turbine engine.

In FIG. 14, the air craft turbine engine 140 is shown including a pair of free piston engines 10. The engines are connected together to form the oscillating drive system 78, as shown in FIG. 5. The drive system 78 in this illustration with two engines 10 connected to a pair of exhaust nozzles 154 for supplying hot exhaust gas to the turbine engine combustors 172. The drive system 78 can include an optional accessory gearbox 176 for other engine accessories.

Figure 15:
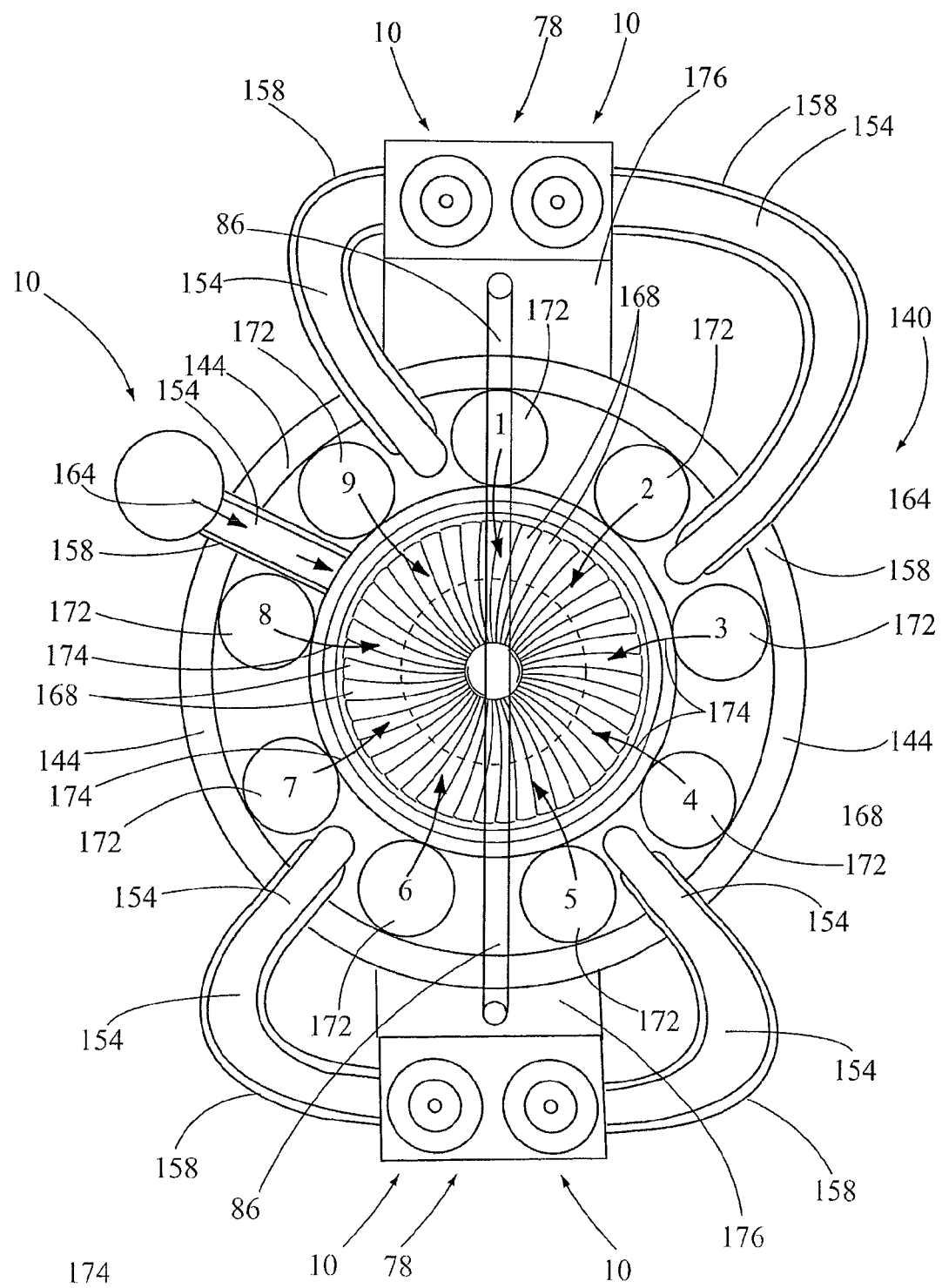
FIG. 15 is similar to FIG. 14 and illustrates a pair of the oscillating drive systems with an output rotary shaft for driving various engine accessories.

In FIG. 15, similar to FIG. 14, a pair of the oscillating drive systems 78 are shown with the accessory gearbox 176. The two gearboxes 176 are used for driving the output rotary shaft 86 for driving various engine accessories and increasing the performance of the aircraft turbine engine 140.

Figure 16:
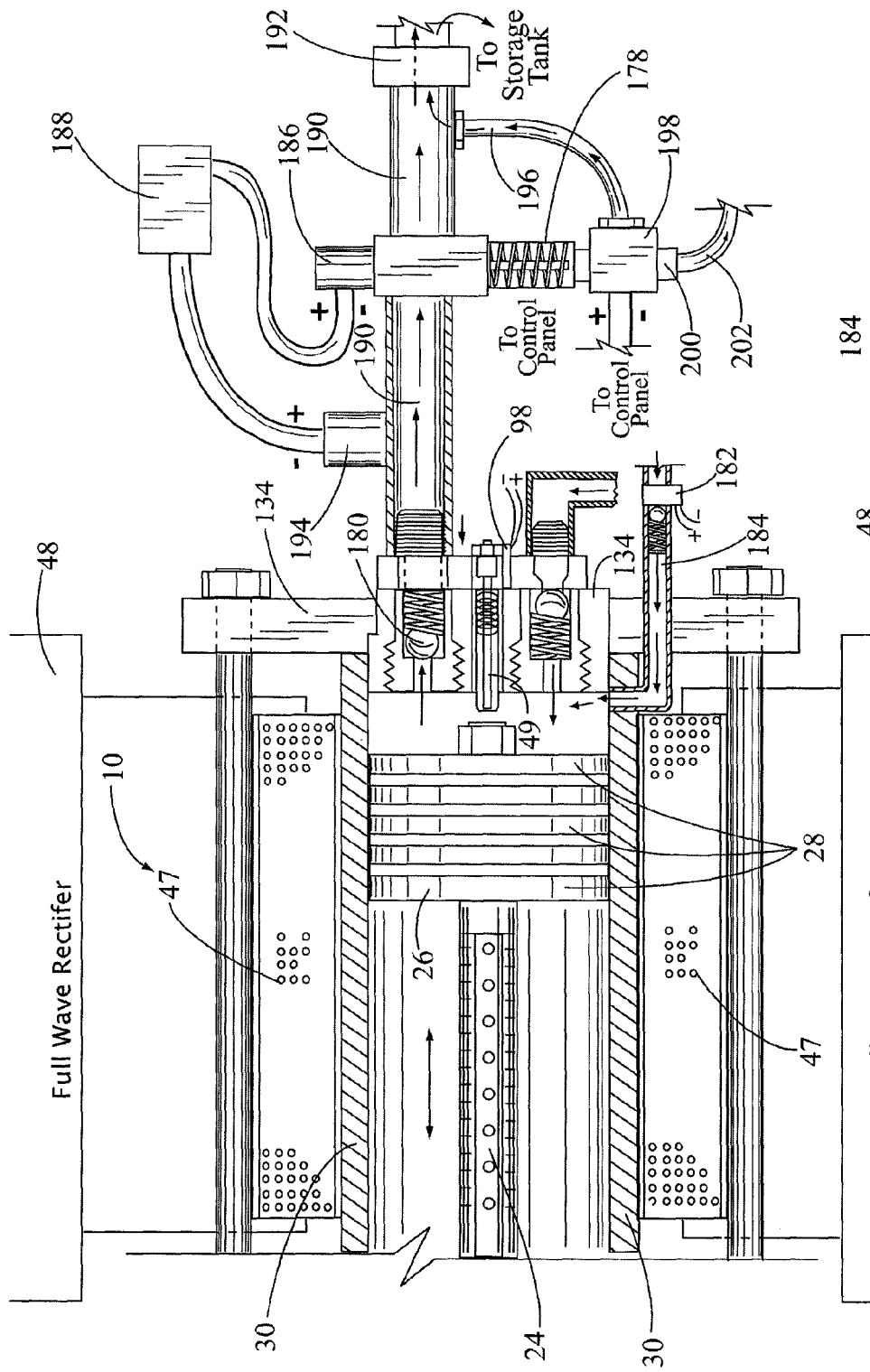
FIG. 16 is a front sectional view of a portion of the free piston engine with an AC generator and a fluid pump head.

In FIG. 16, a front sectional view of a portion of the free piston engine 10 is shown with armature wiring 47 adapted for connection to the full wave rectifiers 48, shown in FIG. 1, and generating AC power. In this drawing, another variation of the engine 10 is shown for creating sufficient combustion pressure for igniting and starting the engine using different types of fuel in the first intake cylinder 30, shown in cross section, and next to the cylinder head 31. The starting system described above is used basically as a liquid pump.

The engine 10 is shown with a fuel line 184, which is opened and closed using a first electric solenoid valve 182. When the valve 182 is opened, a compressed liquid is received inside the cylinder 30 via fuel line 184. At this time, the output valve 180 is closed using a second solenoid valve 186 connected to an engine control panel 188. The first solenoid valve 182 is also connected to the control panel 188. The second solenoid valve 186 is connected to a compressed liquid output line 190 for controlling the flow of liquid to a storage tank. The storage tank isn't shown in the drawings. The liquid output line 190 includes a one-way valve 192. The value 186 holds the liquid in the cylinder 30 and pushes the piston 26 to the left to develop adequate air and fuel inside the power cylinder 18 for starting the free piston engine 10.

The compressed liquid output line 190 also includes a pressure sensor 194, which is also connected electrically to the control panel 188. The second solenoid valve 186 closes the output line 190 at the same time the first solenoid valve 182 is opened for receiving the pressurized liquid into the cylinder 30 during the piston's backstroke. Each side of the engine 10 is equipped with this starting system so that the system alternates in operation during the movement of the piston back and forth. When the engine 10 starts under high pressure, the piston 26 moves to the right. This provides a pressure drop through a liquid vent line 196 controlled by a third solenoid valve 198, which is also connected to the control panel 188.

During startup of the engine 10, a bypass valve 178 passes fluid through valve 198 and through return line 196, which is opened during startup. The valve 198 is then closed during the running of the engine to eliminate wear on the bypass valve 178 and valve 186 is open when the engine is running.

When the piston 26 starts its compression stroke, from left to right in this drawing, the increased pressure is sensed by the pressure sensor 194 and the first solenoid valve 182 is actuated for closing the liquid pressure line 184. Also, the second solenoid 186 opens at this time to allow the system to work during the compression cycle and expel pressurized fluid through the liquid vent line 190. Further, the third solenoid 198 operates a one-way pressure relief valve 200 connected to a second liquid vent line 202 for venting excessive pressurized liquid back to the storage tank. The valve 200 is used to help absorb shock during the combustion of the fuel in the power cylinder 18 and during the start up of the engine 10.

Figure 17:
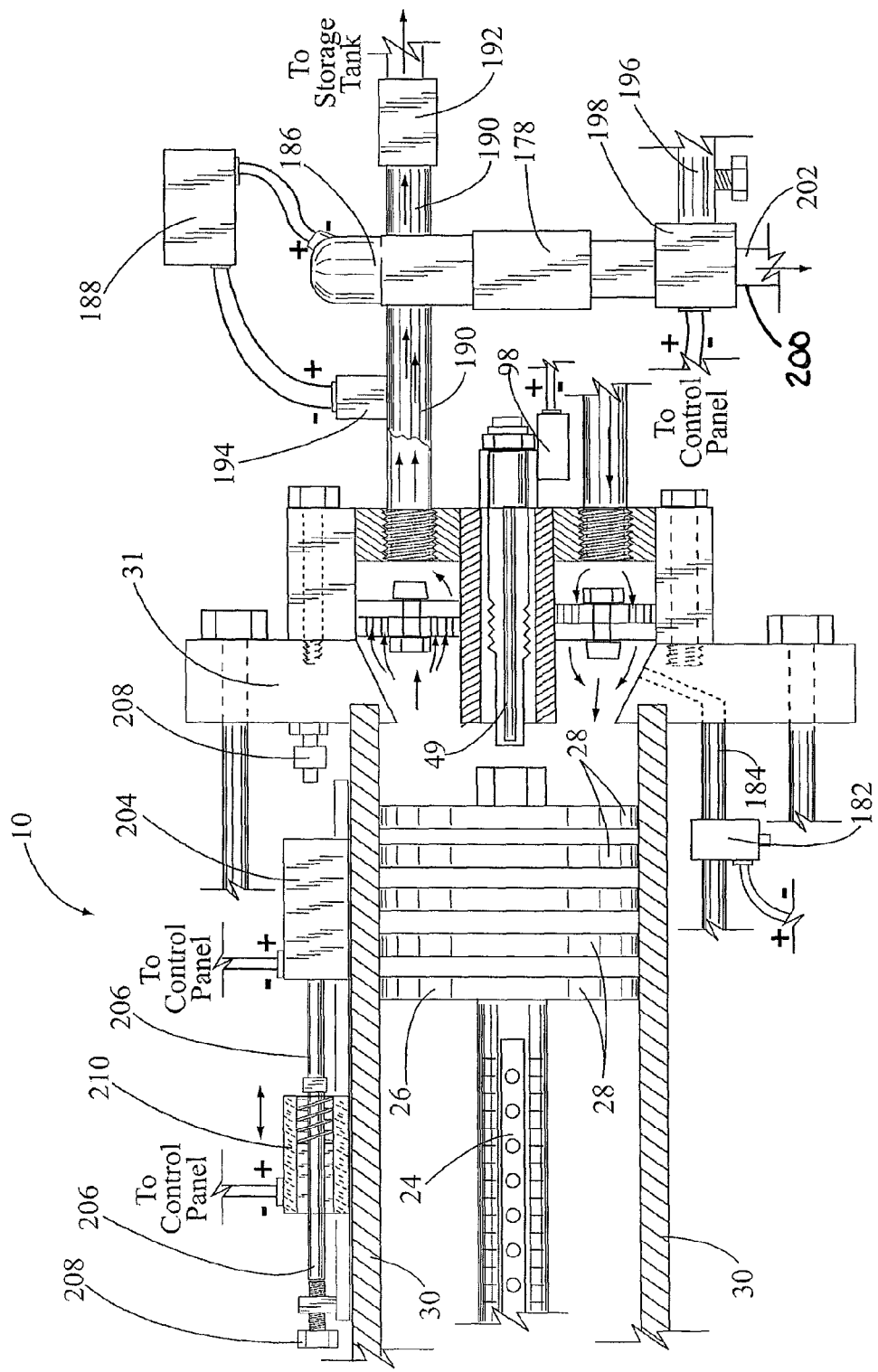
FIG. 17 is front sectional view of a portion of the free piston engine with an air compressor attached to an end of the engine.

In FIG. 17, a front sectional view of a portion of the free piston engine 10 is shown and similar to FIG. 16. This system is for starting the engine under air power. In this drawing, the engine 10 is shown having an alternate ignition system using an ignition sensor 204 slidably mounted on a sliding rod 206 and attached to a top portion of the first intake cylinder 30. The sliding rod 206 includes adjustable stops 208 mounted on opposite ends of the rod. The sensor 204 is wire to and operated by the control panel 188. The ignition sensor 204 is stationary, during the engine cycle, on the sliding rod 206 by picking up the magnetic flux from the magnets 74 embedded in the first intake piston 26, as shown in FIG. 4. Also mounted on the sliding rod 206 is a sliding solenoid 210 connected to the control panel 188 and actuated during engine startup to help move the ignition sensor 204 toward the cylinder head 31 and overcome change in the length of throw of the piston 26 by compressed air/fuel inside the cylinder 18. The ignition switch 49 can by used if necessary as a backup. When the engine 10 begins to fire and the spark plug 58, shown in FIG. 1, continues to fire, the engine temperature rises to the point where the piston compression is sufficient to ignite the air/fuel mixture. At this time, the above mentioned alternate ignition system is no longer needed.

Figure 18:
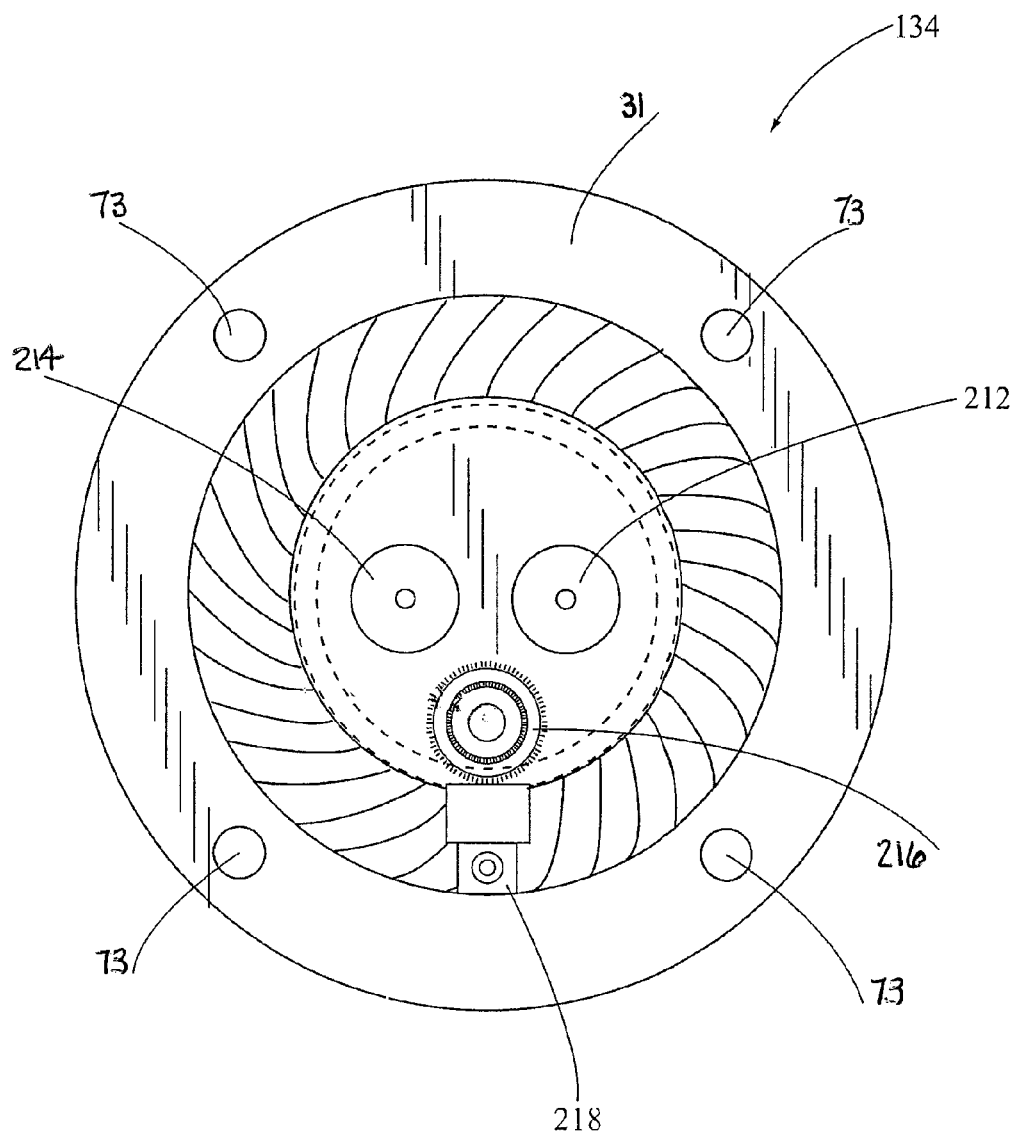
FIG. 18 is an end view of the free piston engine head shown in FIG. 17.

In FIG. 18, an end view of the cylinder head 31, having an outer flange with bolt holes 73, is illustrated and as shown in FIG. 17. In this drawing, the engine 10 is used as an air compressor 134. The air compressor 134 is shown with an input valve 212, an input valve 214, a sensor 216 and a magnetic pickup 218.

Figure 19:
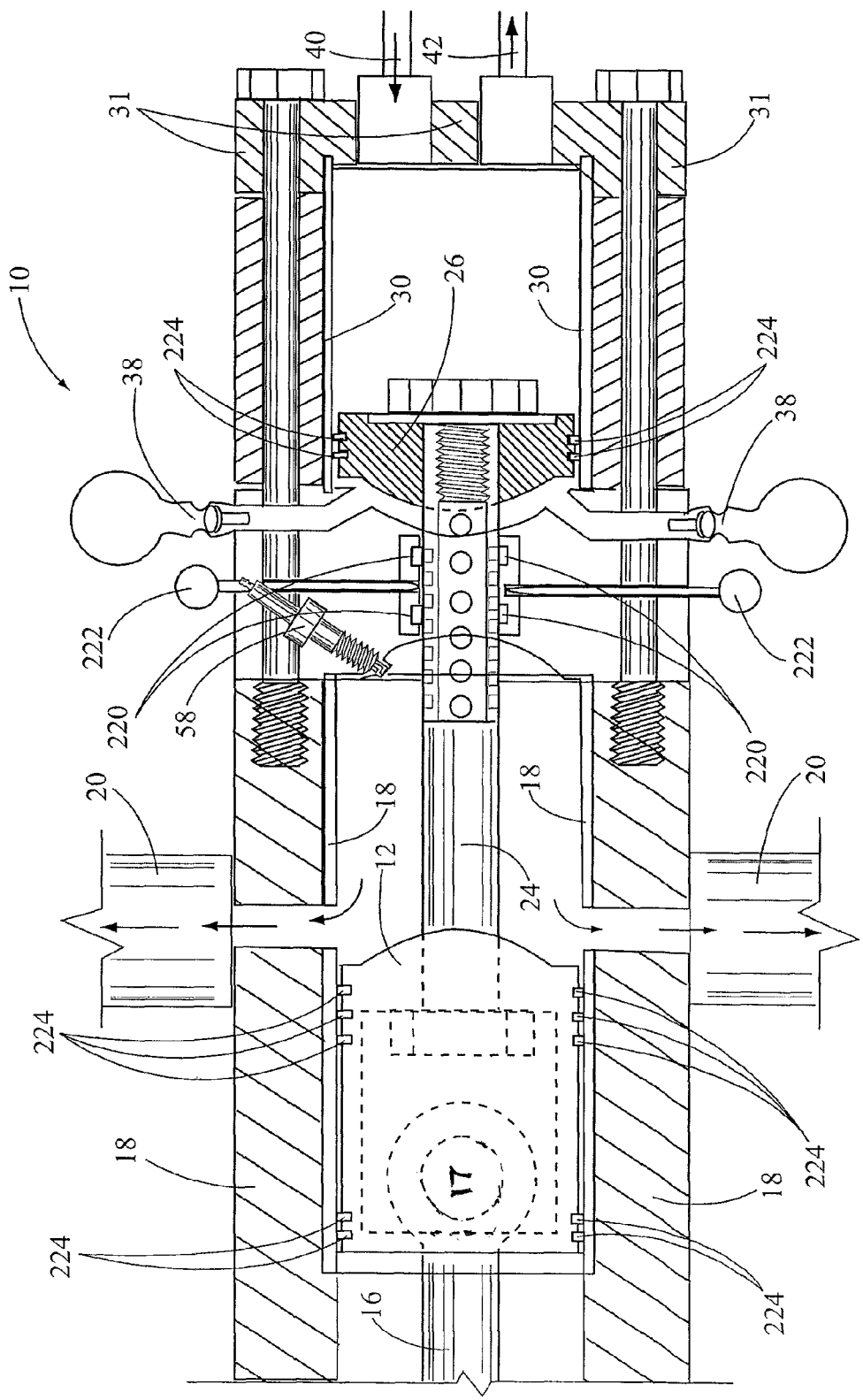
FIG. 19 is a front sectional view of a portion of the free piston engine and used as a 2-cycle engine induction system used in a standard crankshaft application.

In FIG. 19, the subject free piston engine 10 is shown as a standard 2 cycle engine. The piston cylinders 18 and 30 and seals 220 on ported push rod shaft 24 are lubricated using 2 cycle oil through oil ports 222 and intake valve 38 when mixed with the fuel. The pistons 12 and 26 include high pressure sealing rings 224 for providing an efficient intake of the air/fuel mixture through intake valves 38 and efficient exhaust of the hot combustion gases through the exhaust ports 20. This type of system allows for the use of a turbo charger on the engine 10 along with compressing of high pressure air.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A free piston engine used for providing power augmentation to an aircraft turbine engine, the engine comprising: a central cylinder with a central piston slidably mounted therein, the central cylinder including fuel intake valves, for receiving fuel therein, and exhaust ports, for hot exhaust gases to the turbine engine; a piston drive shaft extending outwardly from opposite sides of the central piston; the central cylinder having a pair of spark plugs for igniting fuel received inside the central cylinder; a first bored push rod, one end of the first bored push rod attached to the piston drive shaft; a first intake piston slidably mounted inside a first intake cylinder, the first intake piston attached to an opposite end of the first ported push rod; a second bored push rod, one end of the second bored push rod attached to the piston drive shaft; and a second intake piston slidably mounted inside a second intake cylinder, the second intake piston attached to an opposite end of the second bored push rod.

2. The engine as described in claim 1 wherein the pair of spark plugs are attached to a pair of ignition coils, the ignition coils connected to an ignition switch module turned on and off using an electrical power switch.

3. A linear to rotary motion engine system having a pair of free piston engines attached to a power drive for converting linear motion to rotational motion and used for providing power augmentation to an aircraft turbine engine, the engine system comprising: a first central cylinder with a central piston slidably mounted therein, the central cylinder including fuel intake valves, for receiving fuel therein, and exhaust ports, for exiting hot exhaust gases to the turbine engine, a piston drive shaft extending outwardly from opposite sides of the first central piston, a central cylinder spark plug for igniting fuel received inside of the first central cylinder, a first bored push rod, one end of the first bored push rod attached to the piston drive shaft, a first intake piston slidably mounted inside a first intake cylinder, the first intake piston attached to a first opposite end of the first bored push rod, a second bored push rod, one end of the second bored push rod attached to the piston drive shaft, a second intake piston slidably mounted inside a second intake cylinder, the second intake piston attached to an opposite end of the second bored push rod; a second central cylinder parallel to the first central cylinder, the second central cylinder having with a central piston slidably mounted therein, the second central cylinder including fuel intake valves, for receiving fuel therein, and exhaust ports, for exiting hot exhaust gases to the turbine engine, a piston drive shaft extending outwardly from opposite sides of the first central piston, a central cylinder spark plug for igniting fuel received inside the second central cylinder, a first bored push rod, one end of the first bored push rod attached to the piston drive shaft, a first intake piston slidably mounted inside a first intake cylinder, the first intake piston attached to an opposite end of the first bored push rod, a second bored push rod, one end of the second bored push rod attached to the piston drive shaft, a second intake piston slidably mounted inside a second intake cylinder, the second intake piston attached to an opposite end of the second bored push rod; a first square shaft and disposed between the first and second central cylinders, ends of the square shaft connected to 90 degree square shaft extensions, the extensions connected to the first central cylinder's first and second bored push rods; a second square shaft parallel to the first square shaft and disposed between the first and second central cylinders, the second square shaft connected to 90 degree square shaft extensions, the extensions connected to the second cylinder's first and second bored push rods; a output rotary shaft disposed between the first and second square shafts and parallel thereto; and eccentric connection connected to the ends of the first and second square shaft and connected to a portion of the output rotary shaft for converting the linear motion of the square shafts to rotary motion on the rotary shaft.

4. The engine system as described in claim 3 wherein the 90 degree square shaft extensions are hinged to the ends of the first and second bored push rods and hinged to the opposite ends of the first and second bored push rods and hinged to the opposite ends of the first and second square shafts.

5. The engine system as described in claim 3 wherein the eccentric connection is an eccentric bushing with linkage attached to the ends of the first and second square shafts and to the output rotary shaft.

6. The engine system described in claim 3 wherein the ends of the first and second bored push rods are received in a square housing.

7. The engine system as described in claim 6 wherein the opposite ends of the square housing include oil supply lines for supplying oil to the square housing and the ends of the first and second bored push rods include oil seals received inside the square housing.

* * * * *